(12) United States Patent
Caputo et al.

(10) Patent No.: US 8,335,736 B2
(45) Date of Patent: *Dec. 18, 2012

(54) COMPUTER SYSTEM AND METHOD FOR DETERMINING OPTIMAL ASSET ALLOCATION

(75) Inventors: Edward C. Caputo, Canton, CT (US); Hugh Thomas More Whelan, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,017

(22) Filed: Mar. 2, 2012

(65) Prior Publication Data

US 2012/0166357 A1    Jun. 28, 2012

Related U.S. Application Data

(63) Continuation of application No. 13/085,137, filed on Apr. 12, 2011, now Pat. No. 8,150,755, and a continuation of application No. 12/183,405, filed on Jul. 31, 2008, now Pat. No. 7,925,564.

(51) Int. Cl.
*G06Q 40/00* (2006.01)

(52) U.S. Cl. ........................ 705/36 R; 705/37

(58) Field of Classification Search ............... 705/35–40
See application file for complete search history.

(56) References Cited

U.S. PATENT DOCUMENTS

| | | | |
|---|---|---|---|
| 5,774,881 A | 6/1998 | Friend et al. | |
| 5,806,049 A | 9/1998 | Petruzzi | |
| 5,812,987 A | 9/1998 | Luskin et al. | |
| 5,884,287 A | 3/1999 | Edesess | |
| 6,018,722 A | 1/2000 | Ray et al. | |
| 6,055,517 A | 4/2000 | Friend et al. | |
| 6,078,904 A | 6/2000 | Rebane | |
| 6,154,731 A | 11/2000 | Monks et al. | |
| 6,154,732 A | 11/2000 | Tarbox | |
| 6,336,103 B1 | 1/2002 | Baker | |
| 6,411,939 B1 | 6/2002 | Parsons | |
| 6,601,044 B1 | 7/2003 | Wallman | |
| 6,985,890 B2 | 1/2006 | Inokuchi | |
| 7,120,601 B2 | 10/2006 | Chen et al. | |
| 7,925,564 B2 | 4/2011 | Caputo et al. | |
| 8,224,730 B2 * | 7/2012 | Hadi et al. | 705/35 |
| 8,224,783 B1 * | 7/2012 | Burleigh et al. | 707/654 |
| 2002/0038271 A1 * | 3/2002 | Friend et al. | 705/36 |
| 2002/0082965 A1 | 6/2002 | Loeper | |
| 2002/0188536 A1 | 12/2002 | Milosavljevic et al. | |
| 2003/0028466 A1 | 2/2003 | Jenson et al. | |
| 2004/0054610 A1 * | 3/2004 | Amstutz et al. | 705/36 |
| 2006/0074788 A1 | 4/2006 | Grizack et al. | |
| 2006/0218068 A1 | 9/2006 | Loeper | |
| 2007/0244777 A1 | 10/2007 | Torre et al. | |
| 2010/0030699 A1 | 2/2010 | Caputo et al. | |
| 2011/0191262 A1 | 8/2011 | Caputo et al. | |

* cited by examiner

*Primary Examiner* — Thu Thao Havan
(74) *Attorney, Agent, or Firm* — Buckley, Maschoff & Talwalker LLC

(57) ABSTRACT

A computer system is provided for selecting an asset allocation for an investment portfolio intended to produce a target payout starting at a target date. The computer system is programmed to receive inputs that may relate to the target payout, the target date and a nominal rate of contributions to the investment portfolio. The computer system calculates a plurality of simulated investment outcomes based on assumed investment return rates and assumed inflation rates. The assumed investment return rates and assumed inflation rates are randomly selected in multi-year clusters from historical data. The computer system selects the asset allocation based on relative performance of the assumed asset allocations in the simulated investment outcomes.

20 Claims, 14 Drawing Sheets

| YEAR | 50/40/10 | | 60/35/5 | | 70/30/0 | | 80/20/0 | |
|---|---|---|---|---|---|---|---|---|
| | MEAN | 5th PERCENTILE | MEAN | 5th PERCENTILE | MEAN | 5th PERCENTILE | MEAN | 5th PERCENTILE |
| 1 | 9.53 | (3.73) | 10.44 | (4.67) | 11.34 | (5.70) | 12.15 | (6.60) |
| 2 | 9.43 | (2.75) | 10.31 | (3.55) | 11.19 | (4.47) | 11.97 | (5.26) |
| 3 | 9.30 | 0.15 | 10.14 | (0.26) | 10.97 | (0.80) | 11.70 | (1.27) |
| 4 | 9.29 | 1.54 | 10.12 | 1.31 | 10.93 | 1.01 | 11.65 | 0.74 |
| 5 | 9.22 | 2.42 | 10.04 | 2.33 | 10.84 | 2.16 | 11.54 | 1.94 |
| 6 | 9.20 | 3.12 | 10.00 | 3.10 | 10.80 | 3.00 | 11.49 | 2.88 |
| 7 | 9.18 | 3.62 | 9.99 | 3.69 | 10.78 | 3.66 | 11.47 | 3.61 |
| 8 | 9.16 | 3.99 | 9.96 | 4.08 | 10.74 | 4.13 | 11.43 | 4.14 |
| 9 | 9.16 | 4.34 | 9.95 | 4.47 | 10.74 | 4.59 | 11.42 | 4.64 |
| 10 | 9.16 | 4.62 | 9.96 | 4.80 | 10.74 | 4.94 | 11.43 | 5.01 |
| 15 | 9.15 | 5.50 | 9.95 | 5.77 | 10.73 | 6.03 | 11.42 | 6.23 |
| 20 | 9.17 | 6.00 | 9.97 | 6.37 | 10.76 | 6.71 | 11.44 | 6.98 |
| 25 | 9.17 | 6.34 | 9.97 | 6.74 | 10.75 | 7.11 | 11.44 | 7.40 |
| 30 | 9.16 | 6.59 | 9.96 | 7.03 | 10.75 | 7.45 | 11.43 | 7.80 |

FIG. 7

COMPUTER SYSTEM AND METHOD FOR DETERMINING OPTIMAL ASSET ALLOCATION

CROSS-REFERENCE TO RELATED APPLICATIONS

This is a continuation of prior U.S. patent application Ser. No. 13/085,137, filed Apr. 12, 2011, which is a continuation of U.S. patent application Ser. No. 12/183,405, filed Jul. 31, 2008 (now U.S. Pat. No. 7,925,564), entitled "Computer System and Method for Determining Optimal Asset Allocation", the entire contents of each of which is incorporated herein by reference.

FIELD

The present invention relates to computer systems and more particularly to computer systems employed in connection with investment portfolios.

BACKGROUND

In managing an investment portfolio, a key decision is how to allocate the portfolio assets among different asset classes such as stocks, bonds and cash. This decision may have a large effect upon investment performance. Asset allocation is particularly important with respect to investing for retirement. Typically, retirement investment strategies face a number of uncertainties: (a) Fluctuations in the investor's income over time, (b) market volatility (market risk), (c) failure to save enough for retirement (savings shortfall risk), (d) the possibility of outliving one's assets (longevity risk), and (e) potential loss of purchasing power (inflation risk).

A conventional response to the problem of setting a retirement investment strategy has been the so-called "glide path", which is a year-by-year process of adjusting a portfolio's asset allocation according to the investor's age. The typical glide path shifts the portfolio toward conservative, fixed-income assets and away from riskier, equity-like assets as the investor grows older. There are numerous investment funds—known as "target funds"—that will perform this reallocation more or less automatically.

Conventional strategies for retirement investment usually rely on risk models that characterize factors such as inflation rates, economic-growth rates and asset price volatility as having a "normal" or "Gaussian" distribution. Thus the conventional approach to the glide path assumes that market performance will not differ by a large amount or for long from historical averages. However, there are reasons to question this assumption, since actual historical market performance has been characterized by anomalous events, such as the Sep. 11, 2001 attacks and the 1987 market crash. Accordingly, the conventional glide path retirement investment strategy may fail to reflect real world risks.

SUMMARY

A computer system is disclosed for selecting an asset allocation for an investment portfolio intended to produce a target payout starting at a target date. The computer system includes a processor and a memory in communication with the processor. The memory stores program instructions and the processor is operative with the program instructions to receive inputs with respect to one or more of (a) the target payout, (b) the target date, and (c) a nominal rate of contributions to the investment portfolio.

The processor is further operative with the program instructions to calculate at least 1,000 simulated investment outcomes. The simulated investment outcomes are based on assumed asset allocations that vary from simulated outcome to simulated outcome. The simulated investment outcomes are also based on assumed investment return rates and assumed inflation rates. The assumed investment return rates and assumed inflation rates are randomly selected in multi-year clusters from historical data concerning inflation rates and investment returns.

A "multi-year cluster" is a set of annual inflation rates and asset class investment return rates taken from a two-year, three-year, four-year or five-year period of historical data. A three-year cluster is preferred for present purposes.

The processor is further operative with the program instructions to select the asset allocation based on relative performance of the assumed asset allocations in the simulated investment outcomes.

The present inventors believe that their simulations of investment outcomes based on random sampling in multi-year clusters of historical returns and inflation rates more accurately reflects real world risks than the conventional assumption of normally distributed returns and inflation rates. These simulations allow for improved asset allocation and a glide path that reduces some of the above-mentioned risks of retirement investing.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 7 is a table that shows simulated investment outcomes for various asset allocations.

DETAILED DESCRIPTION

In general, and for the purposes of introducing concepts of embodiments of the present invention, a computer system is used to simulate investment outcomes for a wide range of possible asset allocations. The simulations involve thousands of simulated investor "lives" reflecting various life spans, and various possible future investment environments, constructed by randomly sampling historical inflation and investment return data in three-year clusters. The simulated lives do not rely on assumptions of normal distribution, and may reflect one or more anomalous events. Based on performance of the various assets allocations over the numerous simulated lives, an asset allocation glide path is constructed that more accurately reflects market and mortality risk and that reduces exposure to possible failure of the investment strategy.

Figure 1:
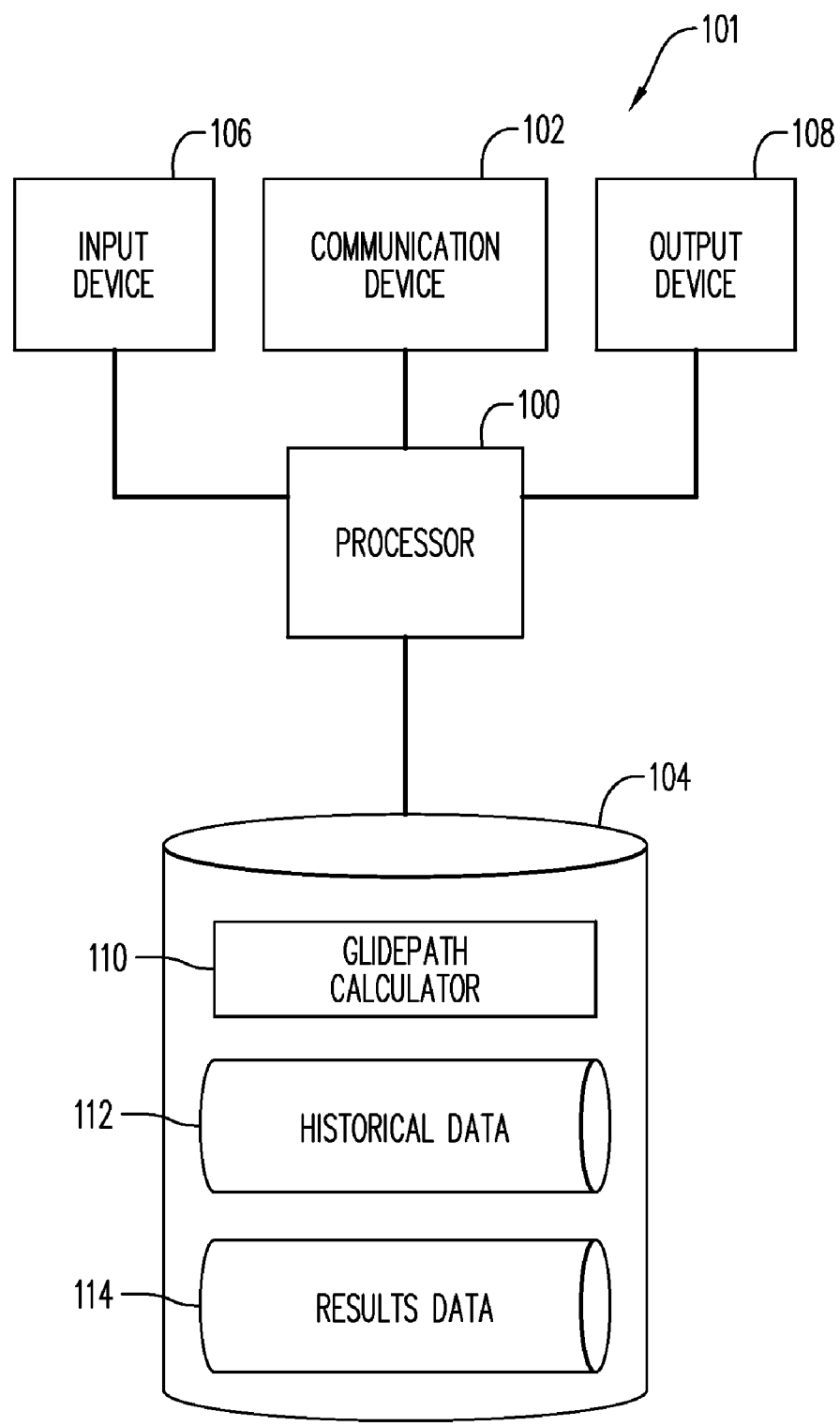
FIG. 1 is a block diagram that illustrates a computer that may perform at least some of the asset allocation process described herein.
Figure 2:
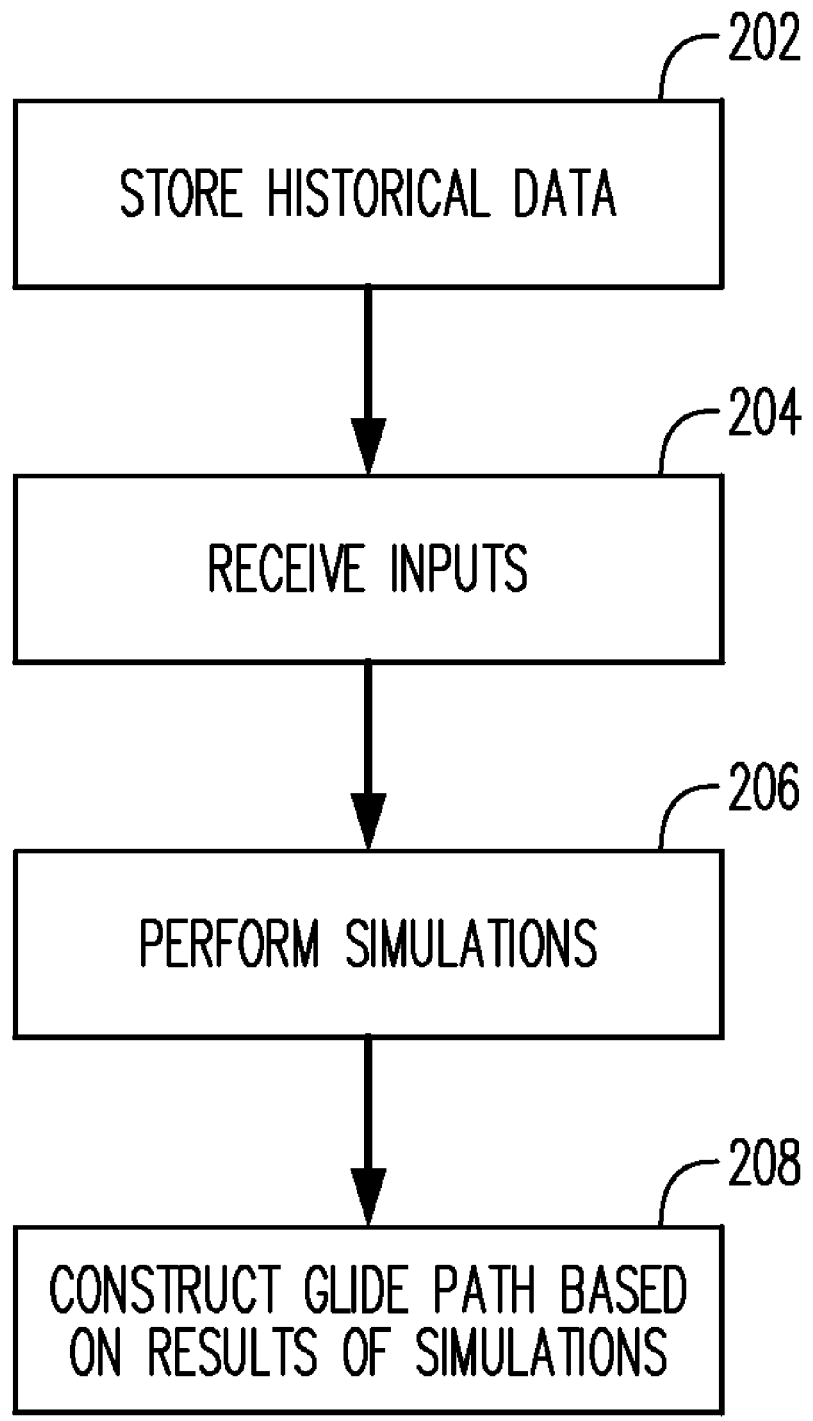
FIG. 2 is a high-level flow chart that illustrates an asset allocation process in accordance with aspects of the present invention.

FIG. 2 is a block diagram that illustrates a computer system 101 that may employed for generating an asset allocation investment strategy in accordance with aspect of the present invention. In its hardware aspects the computer system 101 may be entirely conventional, but may be programmed to operate in accordance with aspects of the present invention. In a practical embodiment, the computer system 101 may be constituted by a conventional personal computer programmed by software that implements functionality as described herein.

As depicted, the computer system 101 includes a computer processor 100 operatively coupled to, and in communication with, a communication device 102, a storage device 104, one or more input devices 106 and one or more output devices 108. Communication device 102 may be used to facilitate communication with, for example, other devices (which are not shown). The input device(s) 106 may comprise, for example, a keyboard, a keypad, a mouse or other pointing device, a microphone, knob or a switch, an infra-red (IR) port, a docking station, and/or a touch screen. The input device(s) 106 may be used, for example, to enter information. Output device 108 may comprise, for example, a display (e.g., a display screen) a speaker, and/or a printer.

Storage device 104 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. As used herein and in the appended claims, a "memory" refers to any one or more of the components of the storage device 104, including removable storage media.

Storage device 104 stores one or more programs (at least some of which being indicated by block 110) for controlling processor 100. Processor 100 performs instructions of the programs, and thereby operates in accordance with the present invention. In some embodiments, the programs may include a program 110 that performs calculations and simulations for the purpose of constructing an asset allocation glide path for retirement investment funds. Functions implemented by the program 110 are described in more detail below.

There may also be stored in the storage device 104 other software, such as one or more conventional operating systems, database management software, device drivers, communications software, etc.

The storage device 104 also stores historical market and economic data indicated at block 112. This historical data 112 may indicate year-by-year investment return rates for various asset classes such as stocks, bonds and cash. Stock investment return data may reflect, for example, annual returns on the S&P 500 index. The bonds investment return data may reflect annual returns on a US Treasury Inflation Notes index. The cash data may reflect annual returns on a 3-month US Treasury Bill index.

In some embodiments, besides the three asset classes referred to in the previous paragraph, the simulated asset allocation may also include additional asset classes for international stocks and high yield bonds. Historical data for the former asset class may reflect annual returns on an index that includes stock markets in European, Asian, and Pacific countries (such as the well-known MSCI EAFE index). Historical data for the latter asset class may reflect annual returns on an index of high yield US corporate bonds.

The historical data may also include data that reflects annual inflation rates in the United States.

The storage device 104 also stores a database 114 for holding results of the calculations and simulations performed by the computer system 101. Other input data, which is not specifically indicated in the drawing, may also be stored by the storage device 104.

FIG. 2 is a high-level flow chart that illustrates an asset allocation process performed by the computer system 101 in accordance with aspects of the present invention.

At 202 in FIG. 2, the historical data 110 is loaded into the computer system 101 from conventional sources of such data.

At 204, information relating to various investment targets and conditions is input into the computer system 101. Details of these inputs are described below in connection with FIG. 3A.

At 206, the computer system 101 performs simulations of investment outcomes based on the historical data 202 and the inputs received at 204. Details of the simulated investment outcomes are described below in connection with FIGS. 3A-3C.

At 208, the computer system 101 constructs one or more asset allocation glide paths that reflect results of the simulations performed at 206. Details of asset allocation glide paths constructed in accordance with aspects of the present invention will also be described below.

Figure 3A:
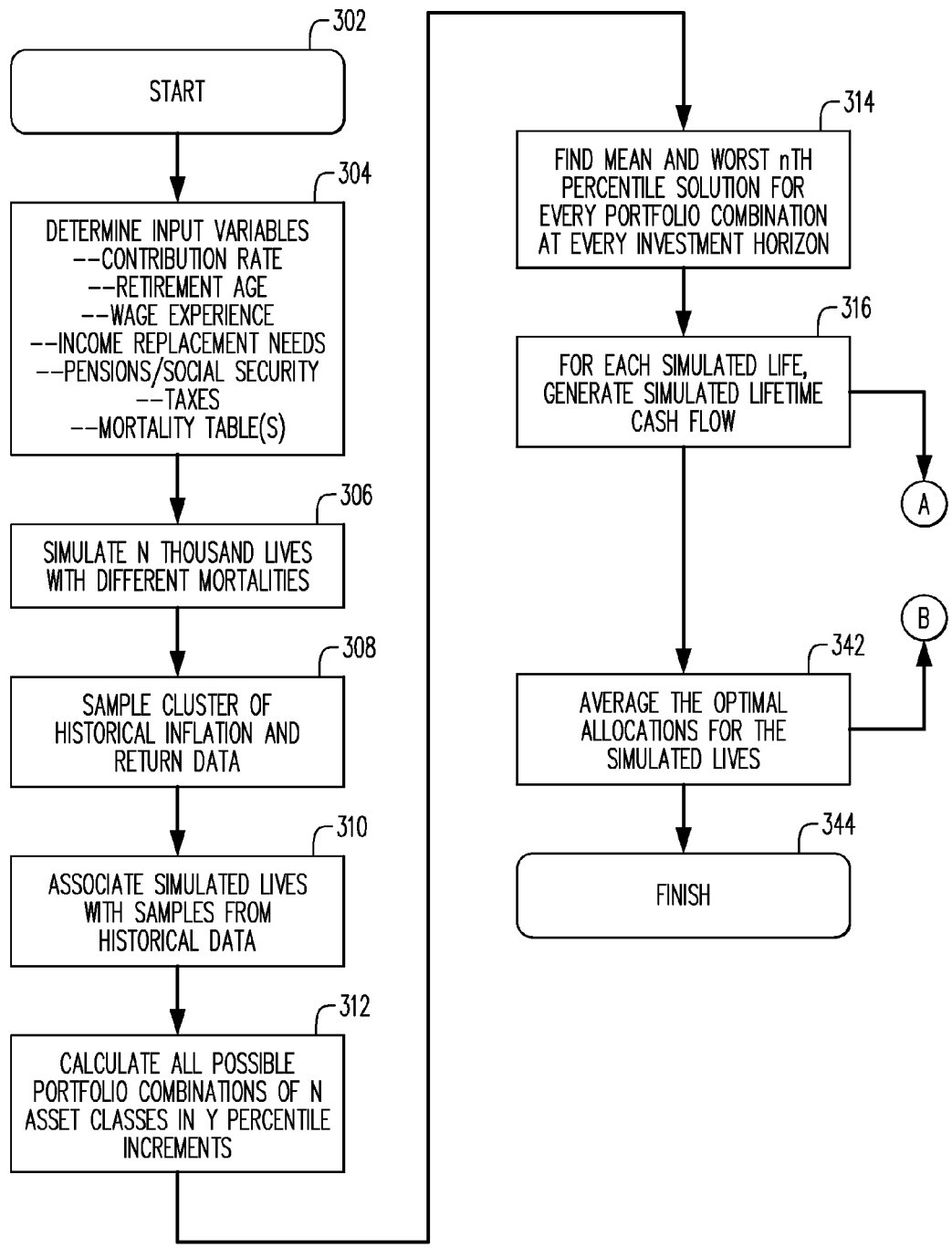
FIGS. 3A-3C together form a flow chart that illustrates details of the process of FIG. 2.
Figure 3B:
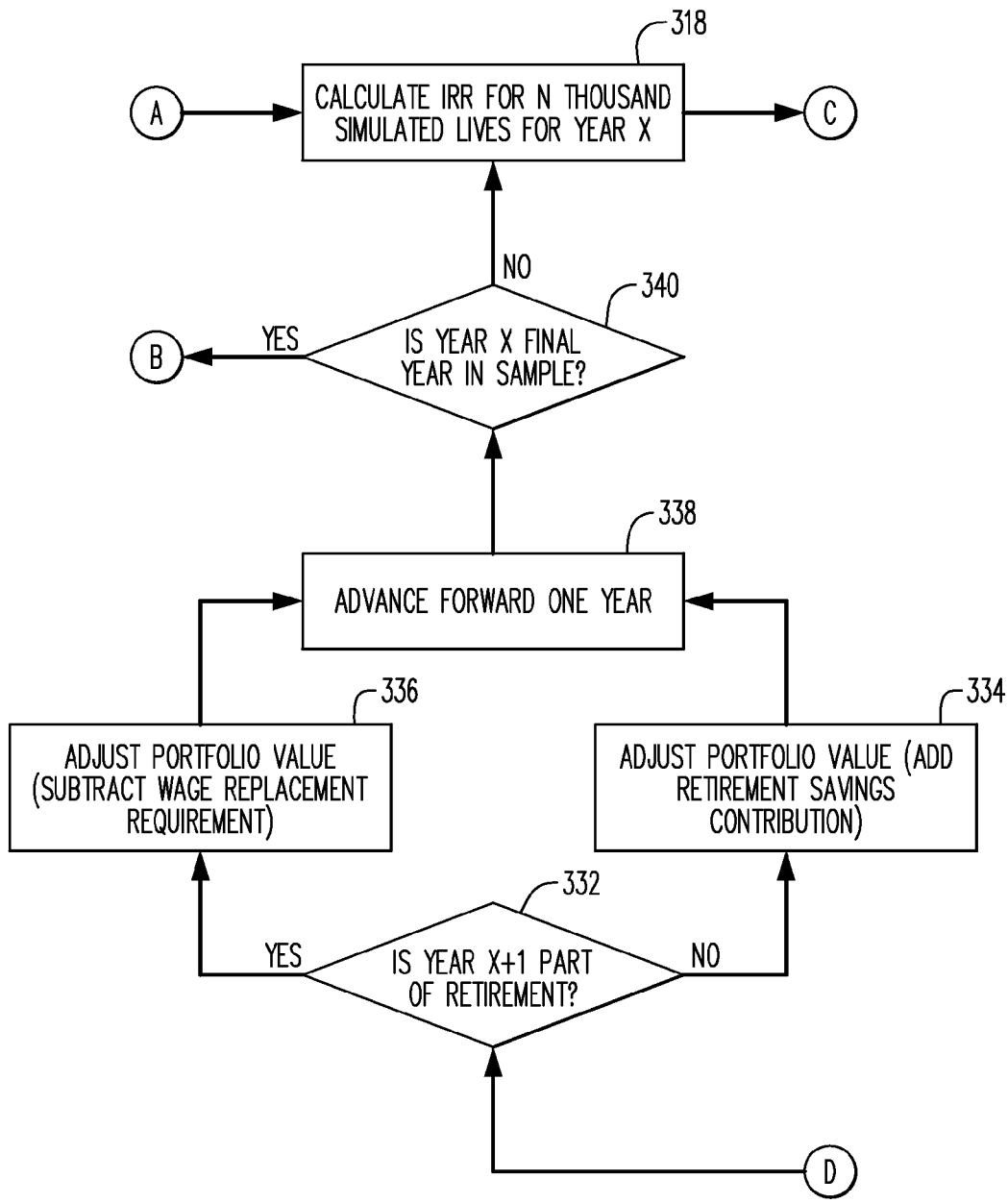
Figure 3C:
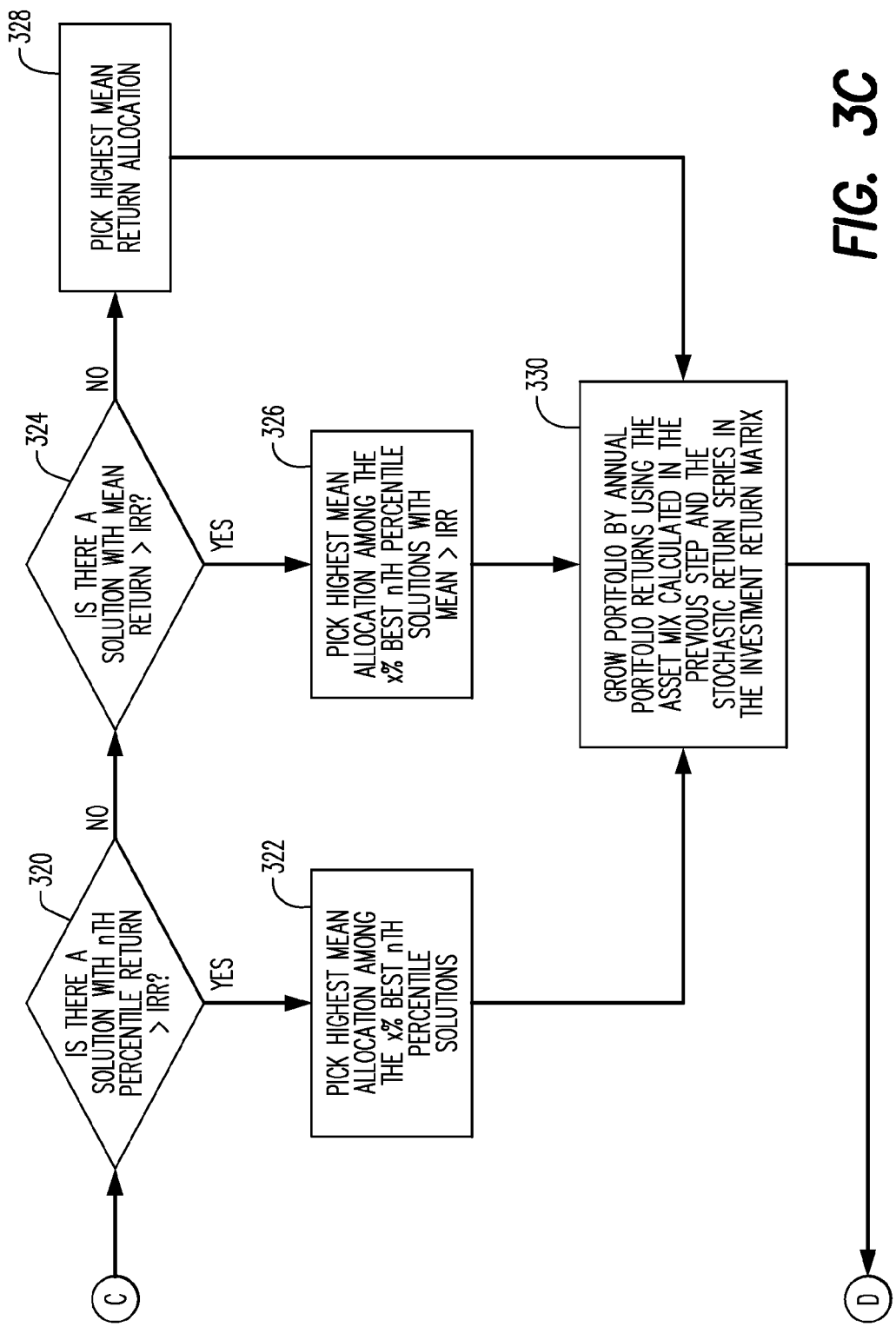

FIGS. 3A-3C together form a flow chart that illustrates details of the process of FIG. 2.

The process of FIGS. 3A-3C starts at 302 in FIG. 3A and advances to 304 in FIG. 3A. At 304 the computer system 101 is operated to receive inputs with respect to certain variables to be used in connection with the investment outcome simulations.

One input is the annual rate of contributions made by the investor(s) to the retirement portfolio. In a preferred embodiment, it is assumed that the contribution rate is 9% of the investors' annual wage income, representing a 6% contribution from the investors themselves, matched with the maximum 3% contribution from the investors' employers.

Figure 4:
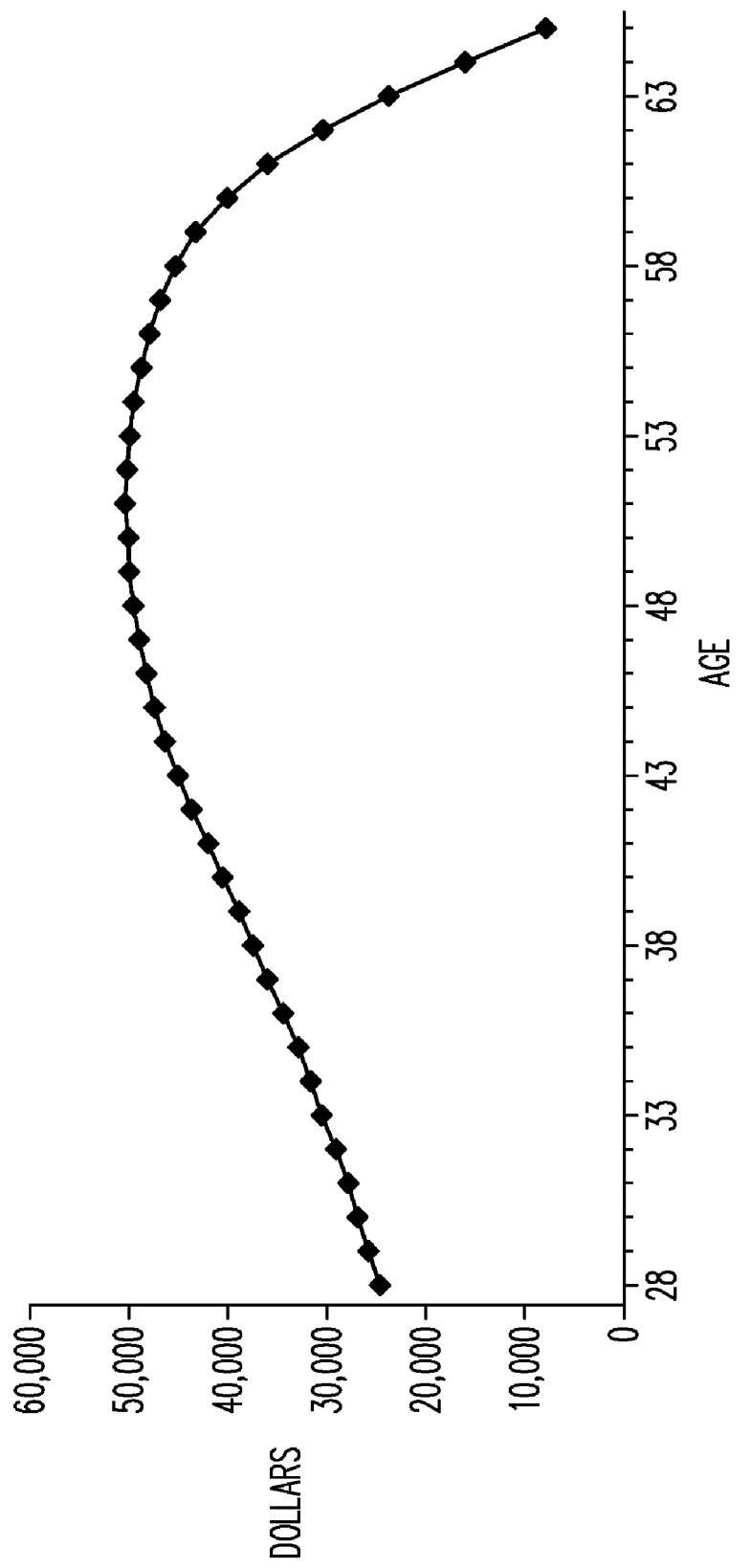
FIG. 4 is a graph that illustrates an expected wage experience that is used as an input to the process of FIGS. 2 and 3A-3C.

Another input is the expected wage income experience for the investors. For the preferred embodiment, the expected wage experience is as indicated in FIG. 4. This expected wage experience reflects studies of actual annual household incomes over the course of a married couple's working life, and shows a year-to-year decrease from ages 53 to age 63, indicative of the likelihood that one of the couple usually leaves full-time employment before age 65.

Another input is the expected retirement age. Trends toward early retirement appear to be reversing. For purposes of developing a glide path that is widely applicable, the present inventors reached the conclusion that 65 is an appropriate expected retirement age for the purposes of the simulations performed in accordance with the invention. In other embodiments, other retirement ages may be used as inputs to the simulation.

Figure 5:
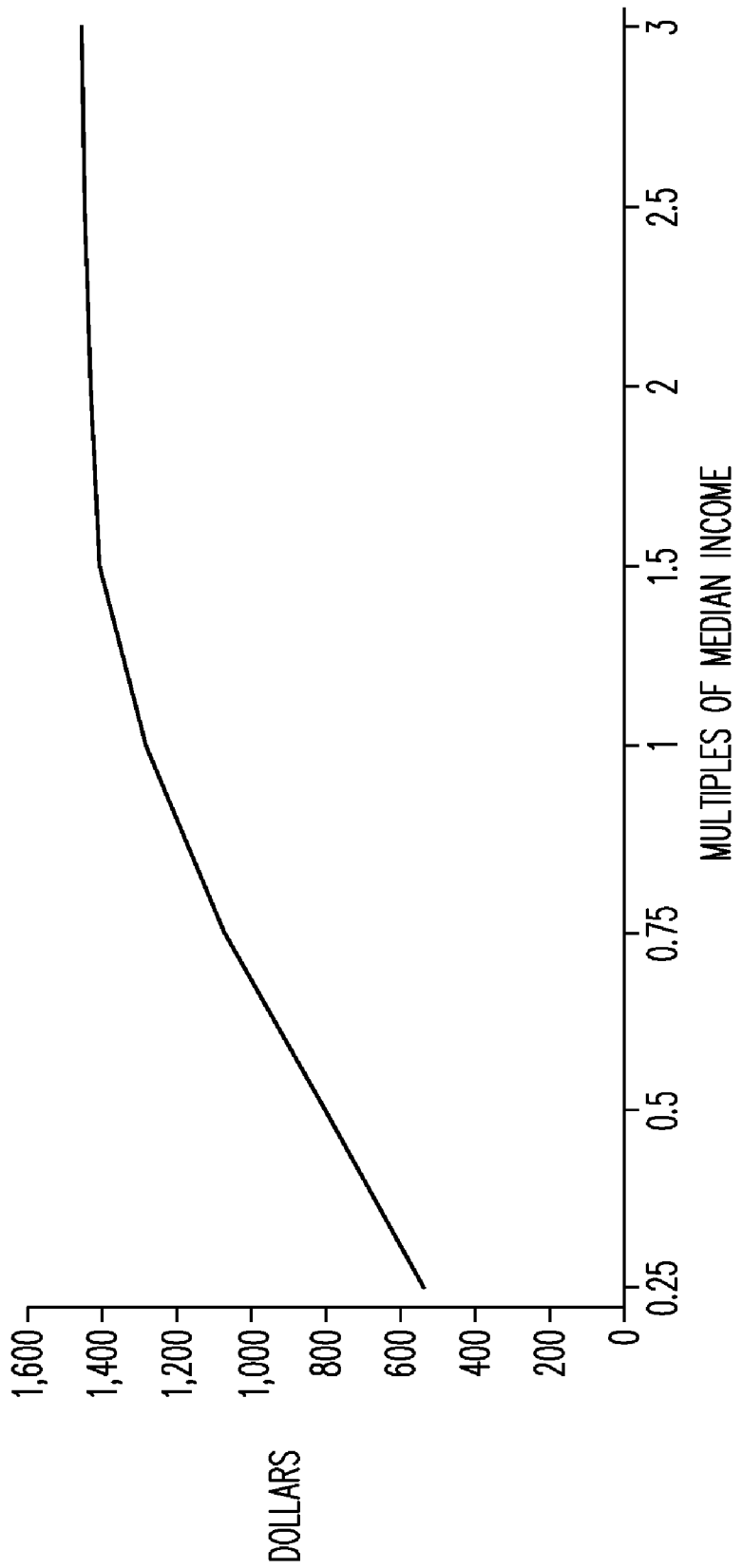
FIG. 5 is a graph that illustrates an expected Social Security benefit profile that is used as an input to the process of FIGS. 2 and 3A-3C.

Another input is the desired retirement income level to be produced by the portfolio from and after the investors' retirement. In a preferred embodiment, the desired level of income is set as 85% of the couple's peak earnings. This is the total income for the couple upon retirement, taking into account likely Social Security benefits, which are considered to be as reflected in FIG. 5. The likely Social Security benefit is thus another input for the simulation process. The target payout for the retirement fund is thus 85% of peak earnings level, less the expected Social Security benefit. For purposes of the simulations, it is assumed that the couple has no defined-benefit pension. This is in line with the increasing rarity of such pensions.

Tax assumptions are also an input for the simulations. It is assumed that contributions are made pre-tax, and that portfolio income is taxed at a 20% rate. This assumption reflects the low federal tax bracket that is likely to be in effect for the level of income of most retirees.

Figure 6:
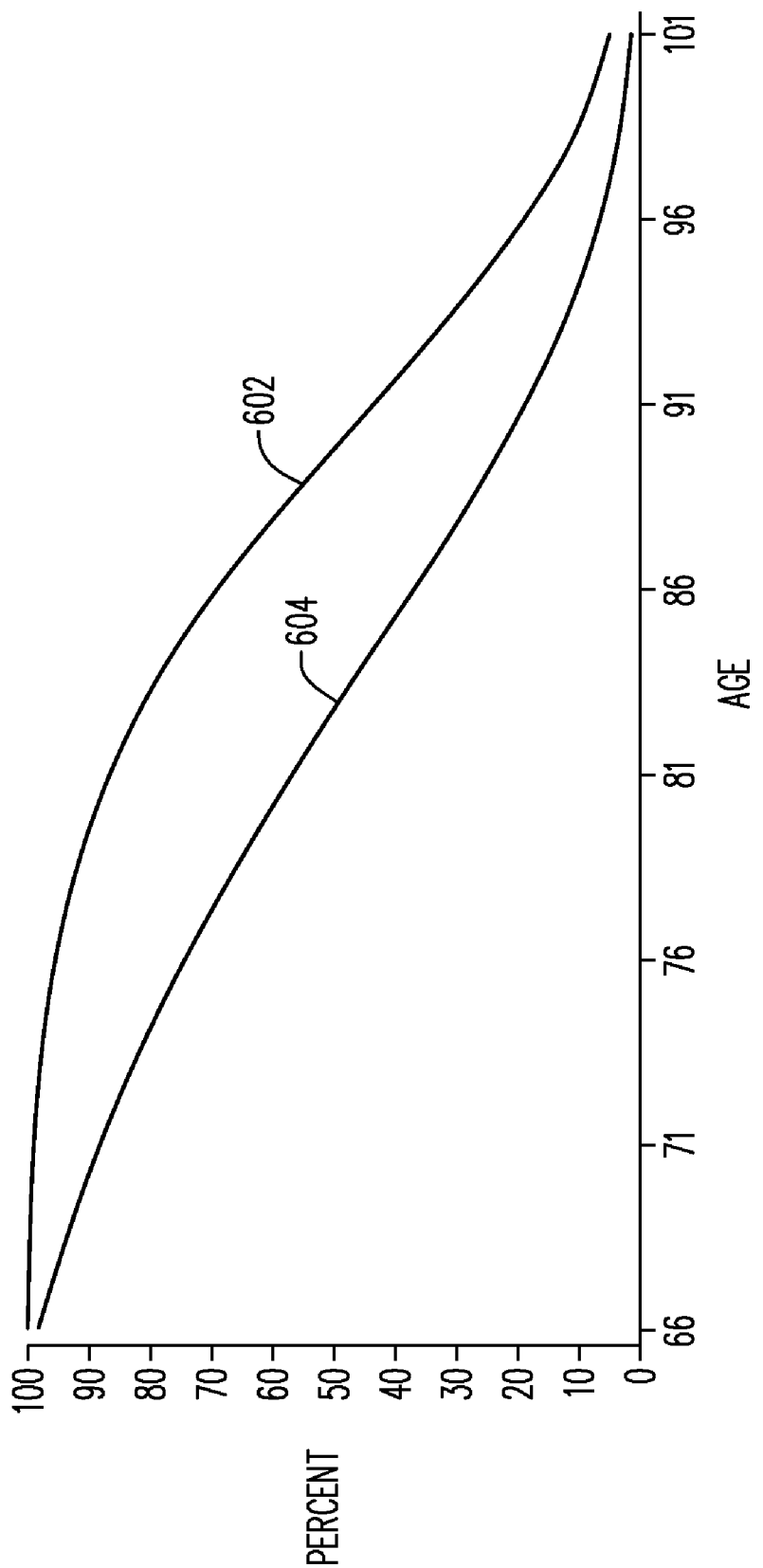
FIG. 6 is a graph that illustrates a joint mortality experience used as an input to the process of FIGS. 2 and 3A-3C.

The simulations, including assumptions already described, are based on retirement planning for a married couple. This is because 70% of all U.S. individuals are married when they reach retirement. Accordingly, both male and female mortality tables are used to generate a conditional probability that at least one member of the couple will be alive as of a given age. (For the purposes of developing this generally applicable glide path, it is assumed that both members of the couple are the same age.) The conditional probability of survival of at least one member is calculated as (1−((1−probability of male survival at age X)*(1−probability of female survival at age X))). FIG. 6 shows a curve 602 that represents the conditional probability of survival of at least one member, and curve 604 in FIG. 6 shows the probability of survival of the male member alone. Considering the probability of survival for at least one member of the couple significantly extends the post-retirement investment horizon, and places a greater demand on the investment portfolio. This is done to make the simulations more fully reflective of the likely needs of the investors.

Following the inputting of variable information at step 304, the process of FIG. 3A advances to 306. At 306, the computer system 101 simulates a considerable number of lives with identical (median) nominal household income and post-retirement income needs (based on 85% of peak earning), but with each simulated life ending at a different time so that overall the average mortality follows the joint probability of survivorship shown by curve 602 in FIG. 6. In a preferred embodiment, the number of simulated lives is 5,000. This number of simulated lives is believed to be optimal in that a larger number of simulated lives is not believed to produce a significant change in the ultimate results.

Next, at 308, the computer system 101 generates a respective set of assumed future economic data to be applied to each of the 5,000 simulated lives. Thus 5,000 sets of assumed future economic data are generated. Each set of assumed future economic data is generated by randomly sampling the historic data in three-year clusters. (Alternatively, two-, four- or five-year clusters may be used.) The sampling of multi-year clusters captures part of any "serial correlation" where one year's performance is to some extent dependent on the previous year's, and so forth. Sampling in this way also captures any "mean reversion" in which market prices that have deviated from their historical averages return to normal levels.

The economic data sampled in each cluster reflects the annual inflation rate in each year of the cluster, and the annual investment return rate for each class of assets. In one simulation, the asset classes are U.S. large-cap stocks, bonds, and cash. In another simulation, two more asset classes are added—international stocks and high-yield bonds—resulting in five asset classes in all.

At 310 in FIG. 3A, each of the simulated lives is associated with a set of assumed future economic data that was produced by random sampling from historical data as described in connection with step 308.

Next, at 312, the computer system 101 calculates a large number of possible asset allocations among the three (or five) asset classes. For example, in the simulation for three asset classes, the various asset allocations are calculated at 5% increments (i.e., 50/45/5, 50/40/10, etc.), which yields 219 different asset allocations.

At 314, the computer system 101 calculates different return scenarios for each possible asset allocation, each year, using the 5,000 lives with the respective assumed future economic data. The computer system 101 then ranks the resulting simulated investment outcomes to find the mean and the worst-fifth-percentile return (hereafter referred to as the fifth-percentile return) for every possible asset allocation at every investment horizon, out to age 100, and beginning when the couple begins making contributions to the retirement fund.

The fifth-percentile return is identified in the interests of prudence. The couple's goal is to avoid outliving their savings, so that if their planning assumes the fifth-percentile return, there is a 95% chance of success. In other embodiments, a higher or lower degree of risk aversion may be employed, so that another percentile return, say in the range of the third-percentile return to the thirtieth-percentile return, may be employed.

FIG. 7 is a chart that presents certain simulated outcomes for the three-asset-class simulation. The numbers inside the chart indicate cumulative annual return rates for the various asset allocations, and the mean and fifth-percentile results for four of the 419 possible allocations are presented. It will be noted that, by year 8, asset allocations with higher proportions of equity and lower proportions of bonds and cash produced better results both as to mean returns and fifth-percentile returns.

The process of FIGS. 3A-3C, then advances to select an optimal asset allocation for each couple among the simulated lives based on their unique (mortality-determined) investment horizon. At 316 the computer system 101 generates a simulated lifetime cash flow for each simulated life in the 5,000 simulated lives. To that end, the process advances to 318 in FIG. 3B. At 318, the computer system 101 calculates an internal rate of return (IRR) for each of the simulated lives in the current year. The process then advances from 318 to decision block 320 in FIG. 3C. At decision block 320, the computer system 101 determines whether there is at least one possible asset allocation with a fifth-percentile return that exceeds the IRR. If so, then block 322 follows decision block 320. At 322, the computer system 101 selects the asset allocation that produced the highest mean return from among the 20% best fifth-percentile allocations.

Considering again decision block 320, if the computer system 101 determines at that point that no possible asset allocation has a fifth-percentile return that exceeds the IRR, then decision block 324 follows decision block 320. At decision block 324, the computer system 101 determines whether there is at least one possible asset allocation with a mean return that exceeds the IRR. If so, then block 326 follows decision block 324. At block 326, the computer system 101 selects the asset allocation that produced the highest mean from among the 20% best fifth-percentile allocations that have a mean return that exceeds the IFF.

Considering again decision block 324, if the computer system 101 determines at that point that no possible asset allocation has a mean return that exceeds the IRR, then block 328 follows decision block 324. At block 328, the computer system 101 selects the asset allocation that produced the highest mean return.

Block 330 in FIG. 3C follows block 322, 326 or 328, as the case may be. At block 330, the computer system 101 increases the portfolio value by the assumed annual returns for that particular year of the simulated life in question, using the asset allocation that was selected at block 322, 326 or 328, as the case may be.

The process then advances to decision block 332 in FIG. 3B. At 332, the computer system 101 determines whether the next year in the simulated life is a year that has occurred after the couple's assumed retirement age. If not, then block 334 follows decision block 332. At block 334, the computer system 101 adjusts the value of the portfolio by adding the assumed annual contribution to the retirement savings portfolio. However, if at decision block 332 the computer system 101 determines that the next year is part of the retirement, then block 336 follows decision block 332. At block 336, the computer system adjusts the portfolio value by subtracting the wage replacement payout previously calculated as being necessary given the couple's peak earnings, and likely income from Social Security.

Block 338 follows either block 336 or 334, as the case may be. At block 338, the computer system 101 increments the current year variable by one. Decision block 340 follows block 338. At decision block 340, the computer system 101 determines whether, for the simulated life in question, the current year is the last year of the simulated life. If not, the process loops back to block 318 and to the process shown in FIG. 3C. Otherwise, the process advances from decision block 340 to block 342 in FIG. 3A. At block 342, the computer system 342 averages the optimal allocations over all of the simulated investment outcomes. The process then ends, as indicated at 344.

A product of the process illustrated in FIGS. 3A-3C is an asset allocation strategy that may be considered optimal for a given investment horizon, taking into account the uncertainties of longevity, investment returns and inflation.

Figure 8:
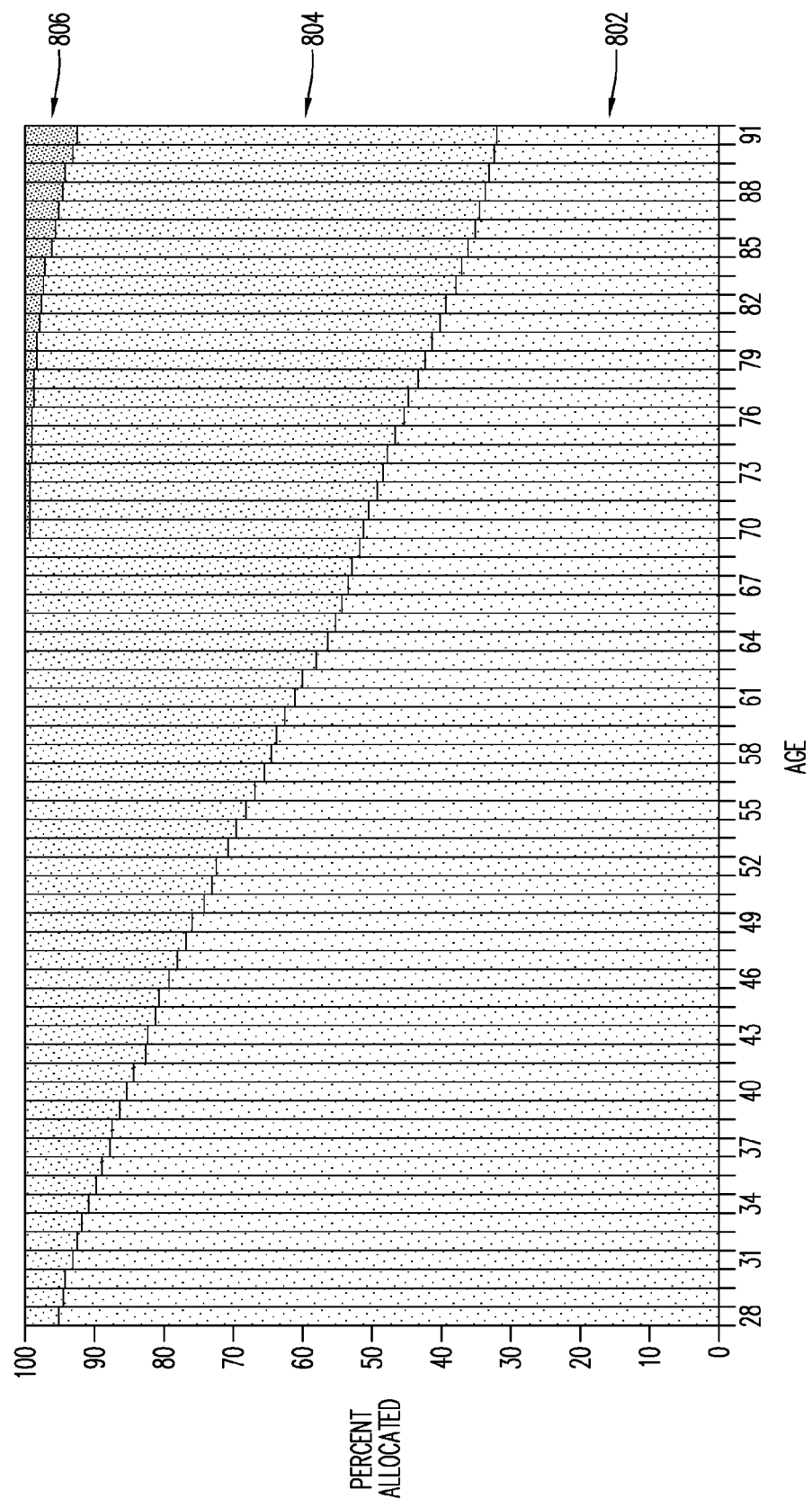
FIG. 8 is a graph that shows a proposed asset allocation glide path, for three asset classes, as constructed in accordance with the process described herein.

FIG. 8 presents, in the form of a bar chart, an optimal asset allocation glide path constructed, based on the above-described simulation, for the three-asset-class allocation referred to above. The portion of the bars at 802 indicates the allocation to U.S. large-cap stocks; the portion at 804 indicates the allocation to bonds; and the portion at 806 indicates the allocation to cash.

A product of the process illustrated in FIGS. 3A-3C is an asset allocation strategy that may be considered optimal for a given investment horizon, taking into account the uncertainties of longevity, investment returns and inflation. The glide path is created using data archived during the simulation process. After completing the simulation, the optimal asset allocation strategy for each year and for each investor is known. The glide path is created by calculating the mean allocation for each asset class for each investor. This is done for each year.

Those familiar with conventional glide path asset allocations will note that the proposed glide path of FIG. 8 calls for substantially more investment in stocks. The simulations performed as described herein suggest that such a portfolio is less risky, in terms of the possibility of ultimate success or failure of the investment strategy, than the conventional glide path that is lighter in allocation of assets to stocks.

Figure 9:
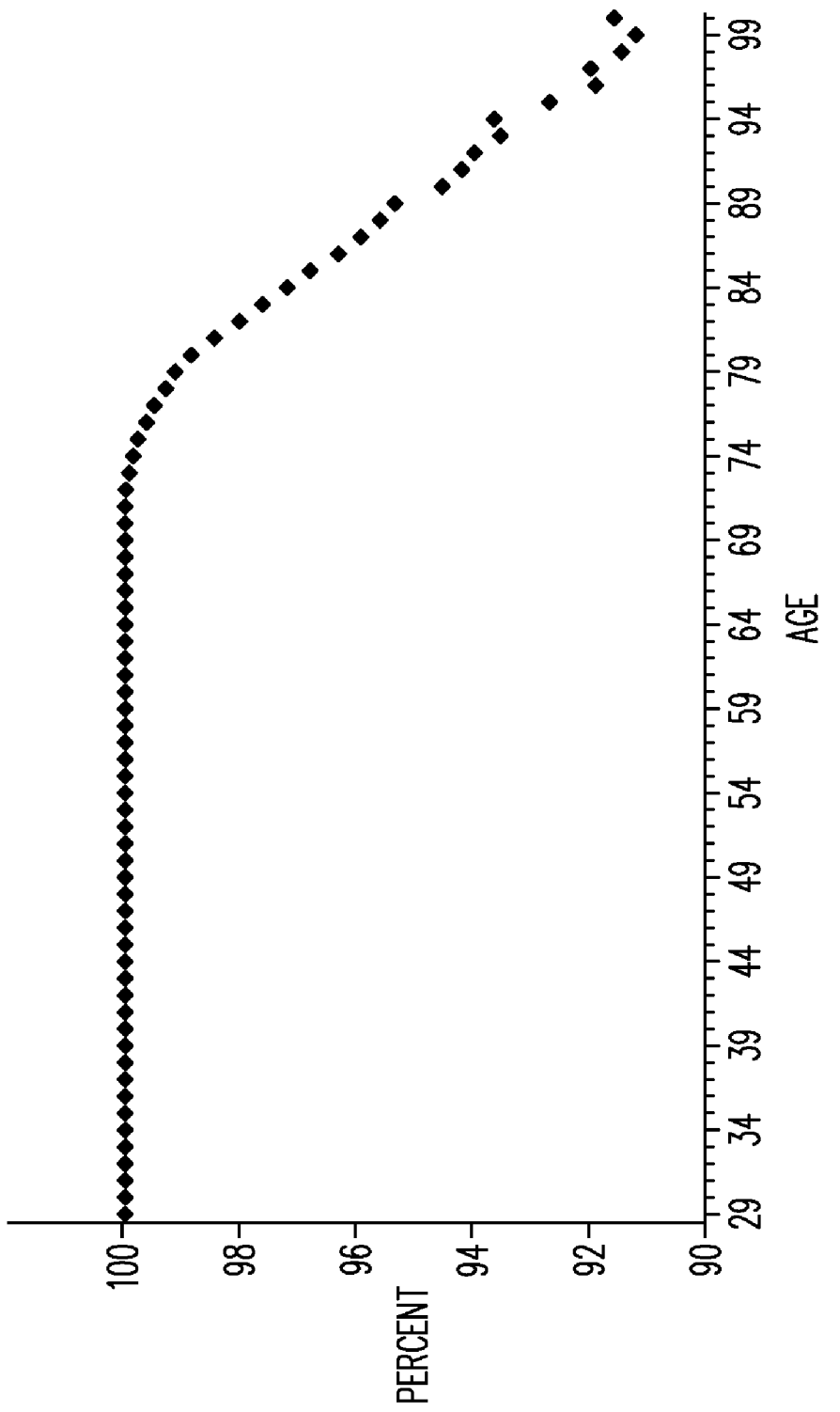
FIG. 9 is a graph that illustrates the likelihood of a successful investment outcome if the asset allocation glide path of FIG. 8 is employed.

FIG. 9 shows the success rate, as presented in the simulations, for the glide path shown in FIG. 8. In this context, the success rate corresponds to the percentage of couples that would have a positive net worth at death. Referring to FIG. 9, the success rate does not begin to decline materially from 100% until an investor is in his/her mid-70s. U.S. life expectancy from birth is about 78 years, and life expectancy from age 65 is about 19 years. Consequently, the average investor has a high chance of success according to the simulation. Even investors who live well past 90 will have a more than 90% chance of not exhausting their assets, according to the simulation results.

As noted above, according to another simulation, five asset classes are used, by adding the asset classes of international stocks and high-yield bonds to the U.S. stocks, bonds and cash asset classes of the first simulation. Since international stocks and high-yield bonds are likely to have moderate to low correlation in performance with U.S. stocks, expanding the portfolio in this way may tend to further increase the likelihood of success.

Figure 10:
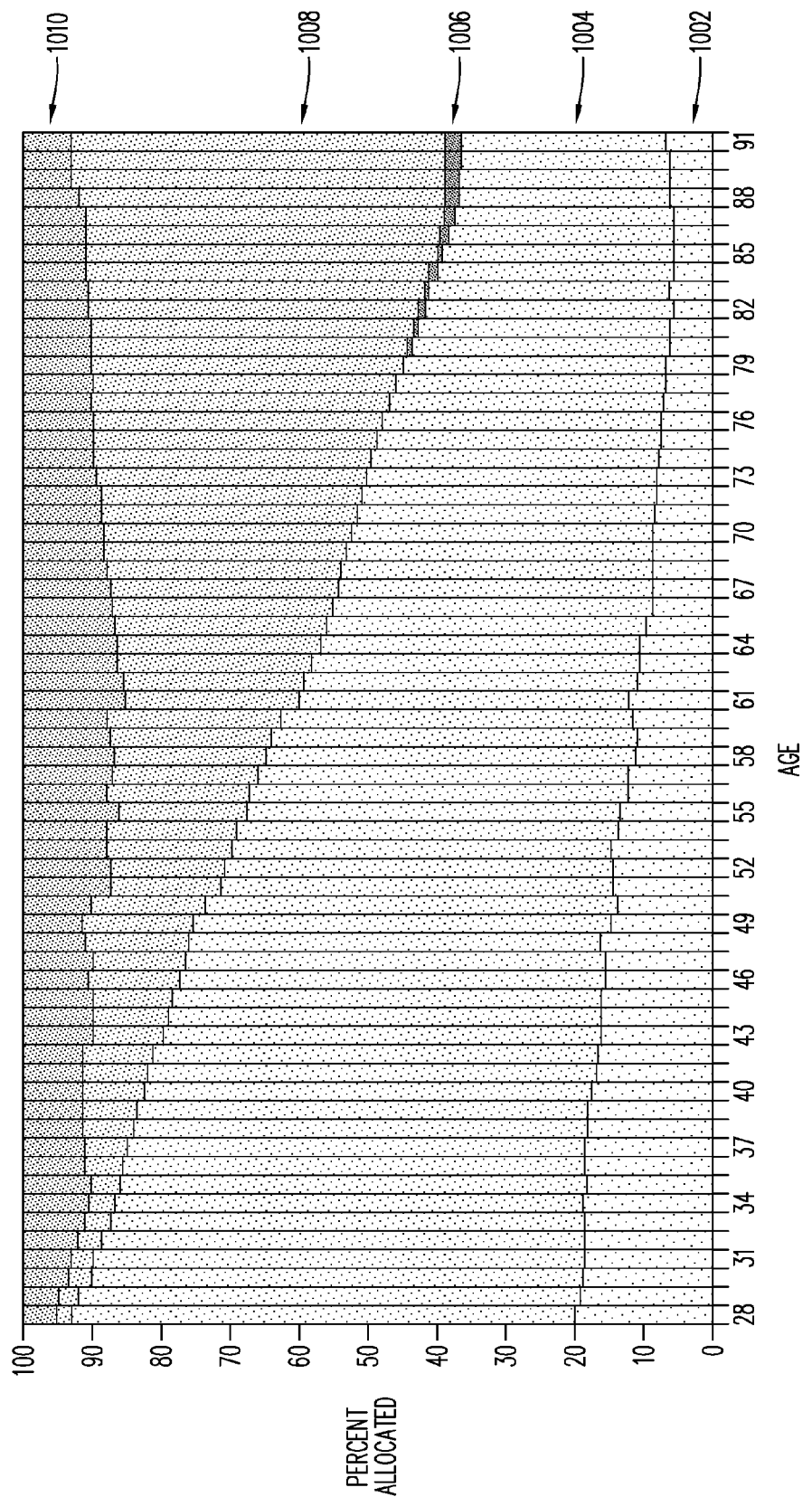
FIG. 10 is a graph that shows a proposed asset allocation glide path, for five asset classes, as constructed in accordance with the process described herein.

FIG. 10 presents, in the form of a bar chart, an optimal asset allocation glide path constructed from the results of the simulation which used the above-mentioned five asset classes. The portion of the bars at 1002 indicates the allocation to international stocks; the portion at 1004 indicates the allocation to U.S. stocks; the portion at 1006 indicates the allocation to cash; the portion at 1008 indicates the allocation to conventional bonds; and the portion at 1010 indicates the allocation to high-yield bonds.

Figure 11:
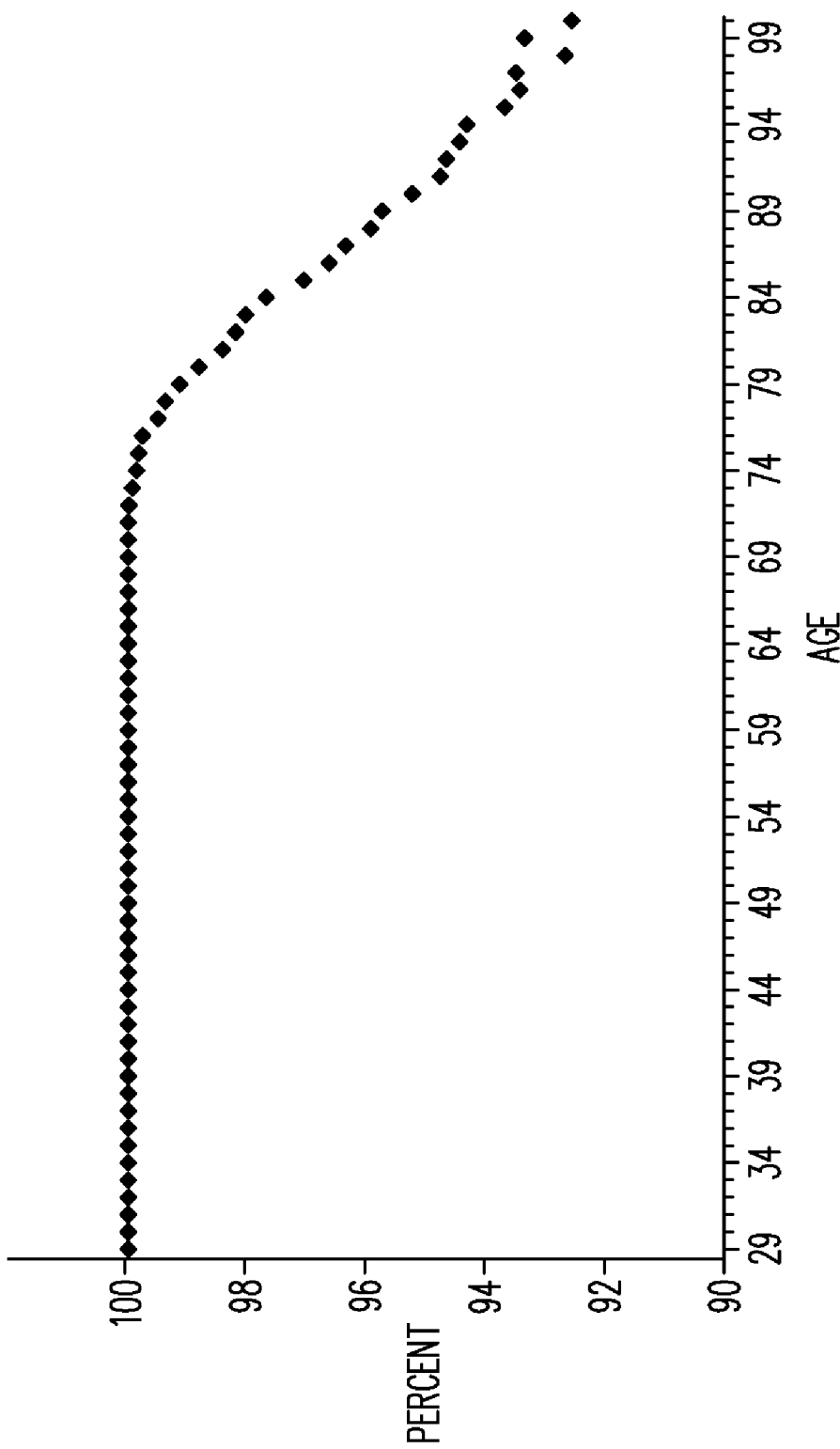
FIG. 11 is a graph that illustrates the likelihood of a successful investment outcome if the asset allocation glide path of FIG. 10 is employed.

FIG. 11 shows the success rate for the glide path shown in FIG. 10, based on the five-asset-class simulations. It will be noted that the addition of the two further asset classes produces a modest improvement in the success rate, which translates into a significant reduction in the number of unsuccessful outcomes for investors who experience greater than average longevity.

Figure 12:
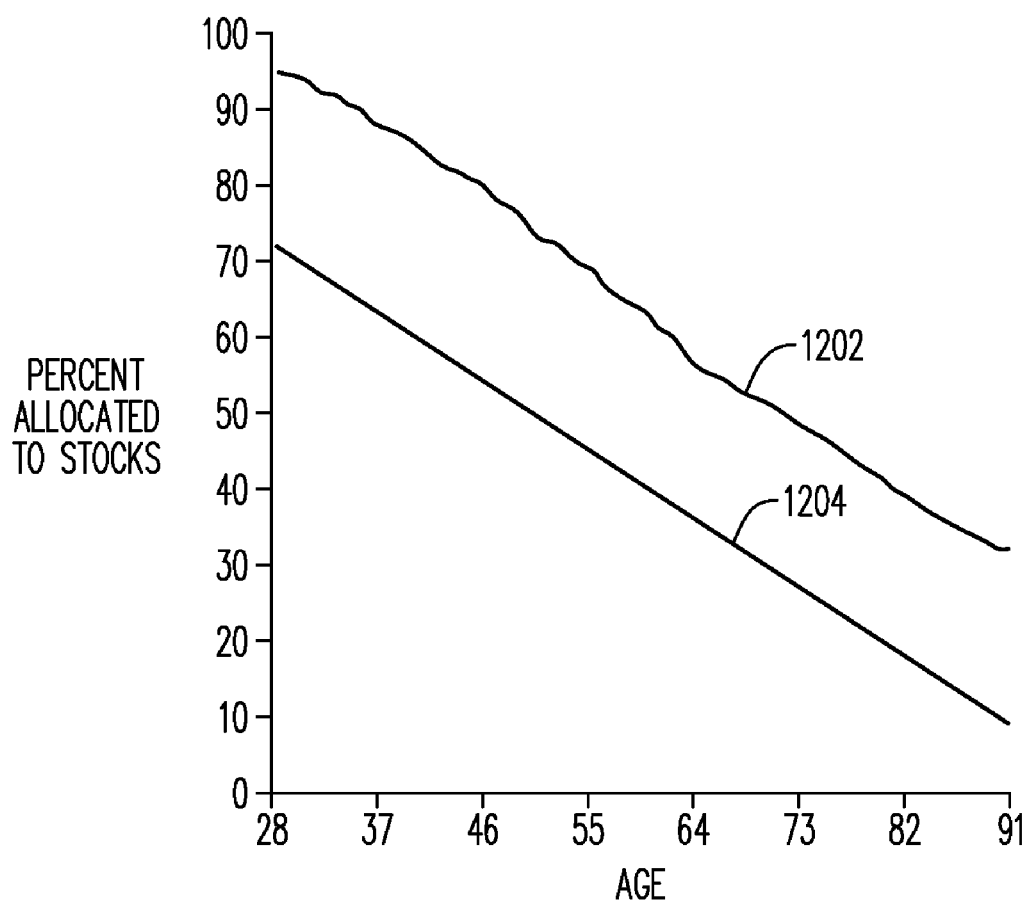
FIG. 12 is a graph that compares allocations to equity assets according to the glide path of FIG. 8 and according to the conventional glide path.

FIG. 12 is a graph that compares the percentage of assets allocated to stocks for the glide path of FIG. 8 with a conventional "100 minus your age" rule-of-thumb glide path. Curve 1202 in FIG. 12 indicates the percent of assets allocated to stocks according to the glide path of FIG. 8. Curve 1204 indicates the percent of assets allocated to stocks by the 100 minus age rule-of-thumb. The simulation results suggest the desirability of modifying the rule-of-thumb to 110 minus age or 120 minus age, as some have proposed.

Either one of the glide paths shown in FIGS. 8 and 10 may be suitable for setting the asset allocation of a large "target" fund for retirement investments. In some embodiments, the glide path or glide paths described herein may be employed to set asset allocations for a target retirement fund or funds over a period of years, such as five years, and then may be constructed again by a similar process of simulations, but also using the additional historical data generated over the five year period, and also adjusting input variables to reflect more recent statistical resources.

The simulations described above are probably somewhat conservative, in the sense that actual investors may well have additional assets, such as non-retirement savings and/or real estate, and thus may have even less exposure to investment strategy failure than indicated by the simulations described herein.

The above-described simulations have assumed no divorce between the members of the couples. However, in alternative embodiments, further simulated lives may be generated that reflect the statistical likelihood of divorce at a given age, and that reflect changes in savings and income needs accordingly. This may cause some changes in the glide paths determined to be optimal according to the simulations.

The above-described simulations have also assumed a uniform retirement age of 65. However, in alternative embodiments, further simulated lives may be generated that reflect the statistical distribution of actual retirement ages. In part, however, the reduction in expected wages from age 53 on, as used in the initially-described simulations, reflects the effect of early retirement on wage experience.

In some alternative embodiments, the simulations may be performed on the basis of individual investors rather than married couples.

The above-described simulations utilized an expected wage experience curve that is characteristic of the general population. However, a different wage experience curve may be employed to construct a glide path for a fund that is managed for a subset of the general population. For example, if the glide path is to be constructed for a retirement fund sponsored by a single large employer, the expected wage experience may reflect the likely wage experience for employees of the fund sponsor.

The historical data and assumed inflation rates used in the above-described simulations are based on a single inflation index, such as the Consumer Price Index. However, the typical purchasing "basket" for retirees is different from the typical purchasing "basket" for the general population. Thus the effective inflation rate for retirees may be different from the general inflation rate. For this reason, in alternative embodiments a different inflation index may be used in the simulation for years after retirement rather than the general inflation index used for years prior to retirement.

It is also the case that the effective inflation rate may vary from region to region within the United States. Therefore, in a suitable case, such as for a retirement investment fund for employees at a particular facility, a regional inflation index may be employed for the simulation rather than a national inflation index.

The above-described simulations were employed to construct an asset allocation glide path suitable for a typical couple, and thus suitable for the asset allocation policies for investment funds having many participants. In alternative embodiments, however, the principles of the present invention may be employed to construct an asset allocation glide path for a particular investor or investing couple. In such embodiments, the inputs entered at step 304 (FIG. 3A) would reflect values pertinent to the situation of the particular investor or investing couple.

The simulations described above are intended to set asset allocation strategies for retirement investment funds for investors in the United States. However, the inputs and historical data may be changed to generate simulations that are suitable for use in constructing an asset allocation glide path for investors in a foreign country. The inputs for these simulations would change in such a case, for example, to reflect the terms of the government old age pension plan in the foreign country instead of the U.S. Social Security system. Demographic information, wage experience, etc., for that foreign country would also be used instead of the corresponding U.S. information.

Up to this point in the discussion, the investment outcome simulations and resulting asset allocation policies have been described in the context of investment for retirement. However, principles of the present invention are also applicable to other long-term investment programs intended to provide a target payout at a target date. College savings programs are one example of such other investment programs to which the present invention is applicable. For a college savings program, the target date is the date at which the investors expect to start being obligated to pay their child's college tuition, and the target amount is the expected cost of the tuition. The simulations involved for constructing a college saving glide path would not involve "lives" in the sense that mortality tables would not come into play. Instead, there would be simulated investment periods each of which would have associated with it a different set of assumed investment returns and inflation rates generated by random sampling in three-year clusters from the historical data, as discussed above in connection with the retirement savings simulations. For example, in effect in the college saving simulation there may be 5,000 simulated lives with different assumed returns and inflation rate experiences, with the lives being considered to "end" upon graduation for purposes of the simulation. Historical experience in regard to inflation of college tuition may be used instead of the Consumer Price Index. In some embodiments, the expected contribution to the college savings program may be a fixed amount per year, rather than a percentage of an annual wage that is expected to change over time.

The process descriptions and flow charts contained herein should not be considered to imply a fixed order for performing process steps. Rather, process steps may be performed in any order that is practicable.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented method for selecting an asset allocation for an investment portfolio intended to produce a retirement income payment starting at a retirement date, the method comprising:
   identifying, by a computer system, information identifying the retirement income payment, the retirement date, and a nominal rate of contributions to the investment portfolio;
   calculating, by the computer system, a plurality of simulated investment outcomes, said simulated investment outcomes based on assumed asset allocations, assumed investment return rates, and assumed inflation rates, said assumed investment return rates and assumed inflation rates selected in time-based clusters from historical data concerning inflation rates and investment returns; and
   selecting said asset allocation based on relative performance of said assumed asset allocations in said simulated investment outcomes.

2. The computer-implemented method of claim 1 wherein the time-based clusters are multi-year clusters and said plurality of simulated investment outcomes comprise at least one thousand simulated investment outcomes.

3. The computer-implemented method of claim 1, wherein said selecting said asset allocation further comprises:
   selecting from among assumed asset allocations that achieved a goal in a predetermined percentage of said simulated investment outcomes.

4. The computer-implemented method of claim 1, wherein said selected asset allocations include asset allocations among three asset classes including stocks, bonds and cash.

5. The computer-implemented method of claim 1, wherein said selected asset allocations include asset allocations among five asset classes, including domestic stocks, international stocks, bonds, cash, and high-yield bonds.

6. The computer-implemented method of claim 1, wherein said identifying further comprises:
   identifying, using said computer system, information identifying at least one of (a) a nominal rate of contributions to the investment portfolio, (b) an assumed wage portfolio, (c) an assumed income replacement need, (d) at least one of an assumed pension benefit amount and an assumed Social Security benefit amount, (e) an assumed tax rate, and (f) male and female mortality tables.

7. The computer-implemented method of claim 2, wherein said multi-year clusters consist of three years.

8. The computer-implemented method of claim 7, wherein said simulated investment outcomes are calculated for a plurality of simulated life spans and has assumed investment return rates and assumed inflation rates associated therewith in three year clusters randomly selected from said historical data.

9. The computer-implemented method of claim 8, wherein said simulated investment outcomes are calculated for a plurality of simulated life spans including a plurality of simulated life spans that reflect a statistical likelihood of divorce at a given age.

10. A computer-implemented method for selecting an asset allocation for an investment portfolio intended to produce a target payout starting at a target date, the computer-implemented method comprising:
   receiving, by a computer system, inputs relating to at least one of (a) the target payout, (b) the target date, and (c) a nominal rate of contributions to the investment portfolio;
   calculating, by a computer system, a plurality of simulated investment outcomes, said simulated investment outcomes based on assumed asset allocations, assumed interest rates and assumed inflation rates, said assumed investment return rates and assumed inflation rates selected in multi-year clusters from historical data concerning inflation rates and investment returns; and
   selecting said asset allocation based on relative performance of said assumed asset allocations in said simulated investment outcomes.

11. The computer-implemented method of claim 10, wherein said multi-year clusters are randomly selected.

12. The computer-implemented method of claim 10, wherein said target rate is an expected retirement data, and said target payout is a retirement income payment.

13. The computer-implemented method of claim 12, wherein said asset allocation is an allocation among at least three asset classes selected from the group consisting of domestic stocks, international stocks, bonds, high yield bonds, and cash.

14. The computer-implemented method of claim 12, wherein said asset allocation is selected based on a goal of not exhausting assets before both members of a couple have died.

15. The computer-implemented method of claim 10, wherein said plurality of simulated investment outcomes comprises at least one thousand simulated investment outcomes.

16. A computer system for selecting an asset allocation for an investment portfolio intended to produce a target retirement income payout starting at a target retirement date, the system comprising:
   an input device for receiving input data, the input data identifying at least one of (a) a nominal rate of contributions to the investment portfolio, (b) a planned retirement age, (c) an assumed wage profile, (d) an assumed income replacement need, (e) an assumed pension benefit, (f) an assumed Social Security benefit, (g) an assumed tax rate, (h) male and female mortality tables, and (i) expected divorce rates;
   a storage device for storing the input data;
   a computer processor in communication with the storage device, the computer processor configured to execute instructions for:
   alculating simulated investment outcomes for a plurality of simulated lives, each of said simulated lives having associated therewith assumed investment return rates and assumed inflation rates, said assumed investment return rates and assumed inflation rates selected in clusters from historical data concerning inflation rates and investment returns, said simulated investment outcomes based on assumed asset allocations in portfolio increments;
   selecting said asset allocation based on relative performance of said assumed asset allocations in said simulated investment outcomes; and
   generating for display on an output device, based on said optimal asset allocation, a glide path of annual asset allocations for a retirement investment fund having a predetermined duration.

17. The computer system of claim 16, wherein said clusters are three-year clusters.

18. The computer system of claim 16, wherein said clusters are randomly selected.

19. The computer system of claim 16, wherein said portfolio increments are 5-percent-of-portfolio increments.

20. The computer system of claim 16, wherein said asset allocation is an allocation among at least three asset classes selected from the group consisting of domestic stocks, international stocks, bonds, high yield bonds, and cash.

* * * * *